June 24, 1958  V. J. COGLEY  2,839,765
COMBINATION RAIL AND LADDER FOR BUNK BEDS
Filed May 3, 1957
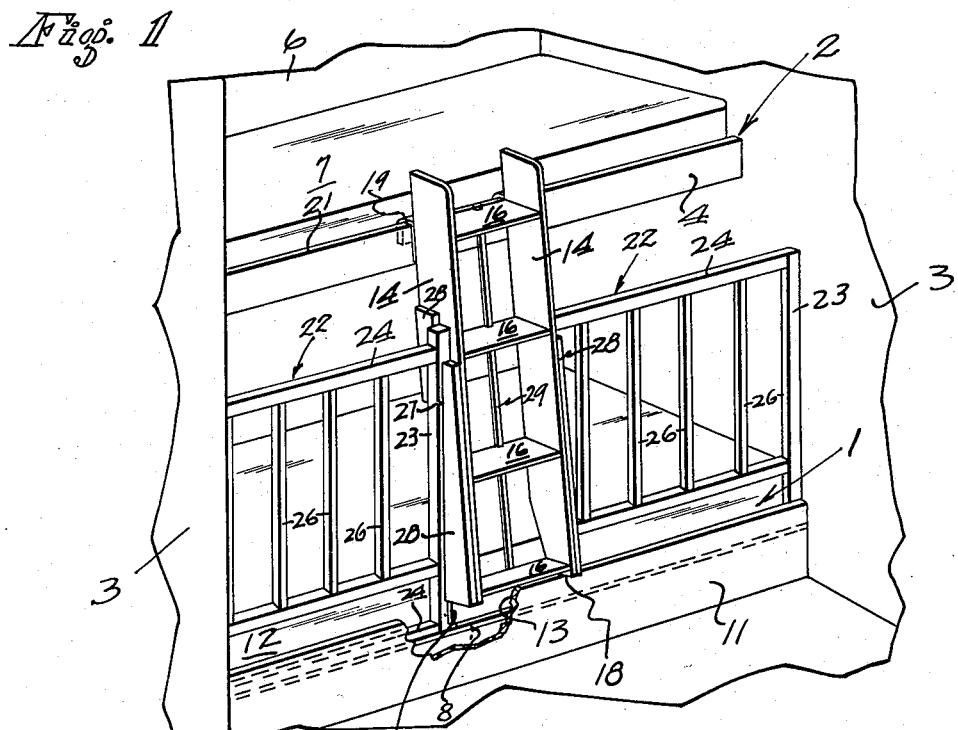
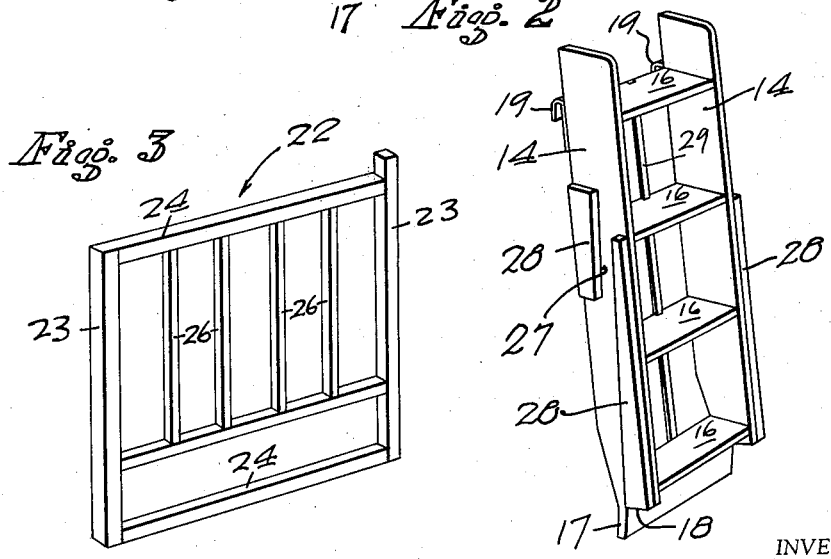
INVENTOR.
VAUGHN J. COGLEY
BY George B White
ATTY.

United States Patent Office 2,839,765
Patented June 24, 1958

2,839,765

COMBINATION RAIL AND LADDER FOR BUNK BEDS

Vaughn J. Cogley, Covelo, Calif.

Application May 3, 1957, Serial No. 656,889

8 Claims. (Cl. 5—317)

This invention relates to a combination rail and ladder for bunk beds.

At the present time bunk beds, particularly in automobile trailers, are open and are provided with a ladder which is leaned against the upper bunk for access. When small children are left on the lower bunk, they fall or crawl off the lower bunk and especially when the trailer is in motion or when the children are left unattended, a risk of injury is involved.

In order to convert the lower bunk of a bunk bed into a safe compartment in which a child can be kept, either as a bed or bunk with a railing or as a playpen, I provide as an object of my invention, barrier railings which can be easily inserted in the lower bunk and a combination with a ladder which when properly secured in position between the upper and lower bunks of the bed, also is automatically interlocked with the railings so as to provide mutual support for holding the railings and the ladder in obstructing position.

Another object of the invention is to provide such bunk railings in combination with a ladder adapted to lock the units in position, and which can be easily and quickly assembled and inserted in position, and in which the locking arrangement between the opposite railings and the ladder predetermines the angle of incline of the ladder in a desirable position.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a perspective view of a bunk bed arrangement in a trailer.

Fig. 2 is a perspective view of one of the railings used on the lower bunk, and

Fig. 3 is a perspective view of the ladder and the locking means on one side thereof.

As shown in Fig. 1, the usual arrangement of a bunk bed or double bunk, includes a lower bunk 1 and an upper bunk 2 spaced above the lower bunk at a convenient distance. In an automobile trailer, the respective bunks extend end to end between opposite walls 3 of the trailer. The upper bunk 2 is narrower than the lower bunk 1, so that the inner side 4 of the upper bunk 2 is offset toward the outer side wall 6 of the trailer relatively to the lower bunk 1. In the upper bunk 2 is supported in the usual manner a mattress 7.

The lower bunk 1 has a suitable bottom 8 or suitable slats as the case may be, and a vertical side 11 along its longitudinal edge inside of the trailer, so as to confine a space for a mattress 12. There is a space 13 between the vertical side 11 of the lower bunk 1 and the mattress 12 for the insertion therein of the various devices hereinafter described.

A ladder for the bunk includes a pair of side rails 14 connected by the usual rungs or steps 16, arranged at a suitable angle to correspond to the incline between offset side 4 of the upper bunk 2 with respect to the lower bunk 1. The ladder rails 14 are comparatively wide. The outer portion of the lower end of each ladder rail 14 is cut away so as to form a leg 17 of about the length and height to fit into the space between the vertical bunk side 11 and the adjacent mattress 12 of the lower bunk 1. The height of each leg 17 is such that the horizontal cut away portion 18 of the ladder rail 14 abuts against the top of the vertical side 11 of the lower bunk 1 when the ladder is properly inserted. Near the top of the ladder, and on either one or on both ladder rails 14 is provided a suitable hook 19 which can be hooked over the top edge 21 of the offset vertical side 4 of the upper bunk 2 to locate the ladder in its position.

A barrier railing structure 22 is provided so as to fit between a ladder rail 14 and the trailer wall at the respective end of the bunk bed. Each carrier railing 22 includes vertical frame members 23 connected at their ends by horizontal frame members 24 thus to form a generally rectangular frame the width of which fits between one of the ladder rails 14 and the adjacent end of the bunk bed, and the height of which may be somewhat less than the vertical distance between the lower and upper bunks. In the frame are provided suitable bars 26, preferably in vertical arrangement as shown, so as to form a barrier or enclosure of the type that is usually used in playpens. Each of the railings 22 is insertable between the vertical bunk side 11 and the mattress 12 of the lower bunk 1.

In order to properly secure and lock in position the respective barrier railings, there is provided on the outside face of each ladder railing 14 a locking groove 27 of a width to fit over the adjacent vertical frame member 23 of the railing 22. It is an important characteristic of the invention that this locking groove 27 is generally vertical or perpendicular with respect to the position of the lower bunk 1 as it is inserted and slides endwise over the respective vertical frame members 23 of the railing 22 so as to hold them in vertical position. This groove 27 is at an acute angle to the longitudinal axis of the side rail 14 of the ladder, and to the angle of incline between the respective inner sides of the upper and lower bunks 1 and 2 at which the ladder is positioned for a properly inclined position when the locking groove 27 is perpendicular.

This locking groove 27 may be formed either in the material of the ladder railing 14 itself if the ladder railing 14 is made sufficiently thick, but in connection with existing ladders now in use, the groove can be formed by superimposing or securing a pair of oppositely longitudinally wedge shaped cleats 28 on the outside face of each ladder railing 14 so as to form the groove 27 therebetween, as shown in Fig. 2. This is for the purpose of adapting old structures to the novel interlocking arrangement herein described.

The ladder also has a longitudinal fixed bar 29 between the ladder rails 14 to obstruct the spaces between the rungs 16 from the underside of the ladder.

The device is very simple in construction, and it can quickly convert the lower bunk of a trailer bunk bed into a playpen or an inclosed bunk wherein an infant or child can be safely kept without the danger of falling out or crawling out of the bunk, and wherein the ladder can be used in its usual manner, yet it has the function of positively interlocking with the railings for fixed positioning of the railings and also the ladder is held in its predetermined position by the opposite railings. The railings are also located by being inserted between the lower vertical side 11 of the lower bunk 1 and mattress 12.

I claim:

1. A combined ladder and barrier railing structure for a bunk bed, comprising a ladder between the upper and lower bunk of the bunk bed, a railing between each side of the ladder and the respective end of the lower bunk of said bunk bed, and interlocking coacting elements on the respective side rails of the ladder and on said railings for interlocking the same in predetermined relative position.

2. The combination with a ladder for a bunk bed extending between the lower bunk and the upper bunk of such bed, a railing frame extended between each side of said ladder and the adjacent end of the lower bunk bed, each railing frame having a generally perpendicular frame member along the adjacent side of the ladder, and a locking element on each side of said ladder longitudinally slidably interlocking with the said generally perpendicular railing frame member so as to interlock the ladder and the railings in predetermined relative position.

3. The combination with a ladder for a bunk bed extending between the lower bunk and the upper bunk of such bed, a railing frame extended between each side of said ladder and the adjacent end of the lower bunk bed, each railing frame having a generally perpendicular frame member along the adjacent side of the ladder, and a locking element on each side of said ladder longitudinally slidably interlocking with the said generally perpendicular railing frame member so as to interlock the ladder and the railings in predetermined relative position, said locking elements including a groove extended at an acute angle to the longitudinal axis of the side rail of the ladder.

4. The combination with a ladder for a bunk bed extending between the lower bunk and the upper bunk of such bed, a railing frame extended between each side of said ladder and the adjacent end of the lower bunk bed, each railing frame having a generally perpendicular frame member along the adjacent side of the ladder, and a locking element on each side of said ladder longitudinally slidably interlocking with the said generally perpendicular railing frame member so as to interlock the ladder and the railings in predetermined relative position, said locking element including a groove at a predetermined acute angle to the angle of incline of the ladder between said bunks.

5. The combination with a ladder for a bunk bed extending between the lower bunk and the upper bunk of such bed, a railing frame extended between each side of said ladder and the adjacent end of the lower bunk bed, each railing frame having a generally perpendicular frame member along the adjacent side of the ladder, and a locking element on each side of said ladder longitudinally slidably interlocking with the said generally perpendicular railing frame member so as to interlock the ladder and the railings in predetermined relative position, said locking elements including a groove at such included angle to the longitudinal axis of the side rails of the ladder as to determine the inclined position of the ladder with respect to the perpendicular.

6. The combination with a ladder for a bunk bed extending between the lower bunk and the upper bunk of such bed, a railing frame extended between each side of said ladder and the adjacent end of the lower bunk bed, each railing frame having a generally perpendicular frame member along the adjacent side of the ladder, and a locking element on each side of said ladder longitudinally slidably interlocking with the said generally perpendicular railing frame member so as to interlock the ladder and the railings in predetermined relative position, said locking elements including a groove at such included angle to the longitudinal axis of the side rails of the ladder as to determine the inclined position of the ladder with respect to the perpendicular, a leg formed on the bottom ends of each side rail of the ladder adapted to be inserted to the inside of the lower bunk.

7. The combination with a ladder for a bunk bed extending between the lower bunk and the upper bunk of such bed, a railing frame extended between each side of said ladder and the adjacent end of the lower bunk bed, each railing frame having a generally perpendicular frame member along the adjacent side of the ladder, and a locking element on each side of said ladder longitudinally slidably interlocking with the said generally perpendicular railing frame member so as to interlock the ladder and the railings in predetermined relative position, said locking elements including a groove at such included angle to the longitudinal axis of the side rails of the ladder as to determine the inclined position of the ladder with respect to the perpendicular, a leg formed on the bottom ends of each side rail of the ladder adapted to be inserted to the inside of the lower bunk, and said frame of said railings being adapted to be inserted between the longitudinal side of the lower bunk and the mattress therein adjacent said legs.

8. The combination with a ladder for a bunk bed extending between the lower bunk and the upper bunk of such bed, a railing frame extended between each side of said ladder and the adjacent end of the lower bunk bed, each railing frame having a generally perpendicular frame member along the adjacent side of the ladder, and a locking element on each side of said ladder longitudinally slidably interlocking with the said generally perpendicular railing frame member so as to interlock the ladder and the railings in predetermined relative position, said locking elements including a groove at such included angle to the longitudinal axis of the side rails of the ladder as to determine the inclined position of the ladder with respect to the perpendicular, a leg formed on the bottom ends of each side rail of the ladder adapted to be inserted to the inside of the lower bunk, a cut away portion on the outer lower edge of each side rail of said ladder forming said leg and forming a shoulder adapted to rest on the adjacent side of the lower bunk.

References Cited in the file of this patent

UNITED STATES PATENTS

| | | |
|---|---|---|
| 2,059,240 | Johnston | Nov. 3, 1936 |
| 2,528,307 | Heaney | Oct. 31, 1950 |
| 2,657,400 | Pagon | Nov. 3, 1953 |